(12) United States Patent
Wadhwa

(10) Patent No.: US 9,020,931 B2
(45) Date of Patent: Apr. 28, 2015

(54) SYSTEM AND METHOD FOR ENHANCING SEARCH EXPERIENCE OF A USER OF A COMMUNICATION DEVICE

(71) Applicant: Avaya Inc., Basking Ridge, NJ (US)

(72) Inventor: Jitendra Singh Wadhwa, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 315 days.

(21) Appl. No.: 13/630,209

(22) Filed: Sep. 28, 2012

(65) Prior Publication Data

US 2014/0095477 A1   Apr. 3, 2014

(51) Int. Cl.
*G06F 17/30* (2006.01)
*H04M 3/56* (2006.01)

(52) U.S. Cl.
CPC ............................... *G06F 17/30672* (2013.01)

(58) Field of Classification Search
USPC ................................................. 707/705, 722
See application file for complete search history.

(56) References Cited

U.S. PATENT DOCUMENTS

| | | | |
|---|---|---|---|
| 2006/0177034 A1* | 8/2006 | Reding et al. | 379/211.02 |
| 2008/0159503 A1* | 7/2008 | Helbling et al. | 379/142.17 |
| 2009/0030894 A1* | 1/2009 | Mamou et al. | 707/5 |
| 2010/0015976 A1* | 1/2010 | Issa et al. | 455/435.1 |
| 2012/0084291 A1* | 4/2012 | Chung et al. | 707/741 |
| 2013/0297324 A1* | 11/2013 | Phillips et al. | 705/2 |

* cited by examiner

*Primary Examiner* — Hung T Vy
(74) *Attorney, Agent, or Firm* — Maldjian Law Group LLC; John Maldjian; Alexander D. Walter

(57) ABSTRACT

Embodiments of the present invention may enable a communication device to search for multiple results from a database by using a single search query. The communication device may include a display screen, a processor, and a memory coupled to the processor. The memory may include a database and an instruction set. The database may store contact information of one or more entities. Further, the instruction set may include instructions executable by the processor to scan a query received from a user to recognize special characters and wild cards in the query. Further, the instructions may divide the query into multiple sub-queries based on the use of the special characters in the query. Furthermore, the instructions may execute and display results of the sub-queries in a user friendly manner.

20 Claims, 11 Drawing Sheets

| | Query 1 (101) 502 | Query 2 (ghosh) 504 | Query 3 (Yoakum) 506 | Query 4 (Brian) 508 | Query 5 (+9173*7) 510 |
|---|---|---|---|---|---|
| Result 1 | 31019200 | Amy Ghosh | Yoakum, John | Brian | +91973507 99107 |
| Result 2 | 41019214 | Arpan Ghosh | Peter, Yoakum | Brian Macullam | +91738119 8107 |
| Result 3 | 61019218 | Bob Ghosh | | Brian Siddle | |
| Result 4 | | Rana Ghosh | | | |

Database 500

FIG. 5

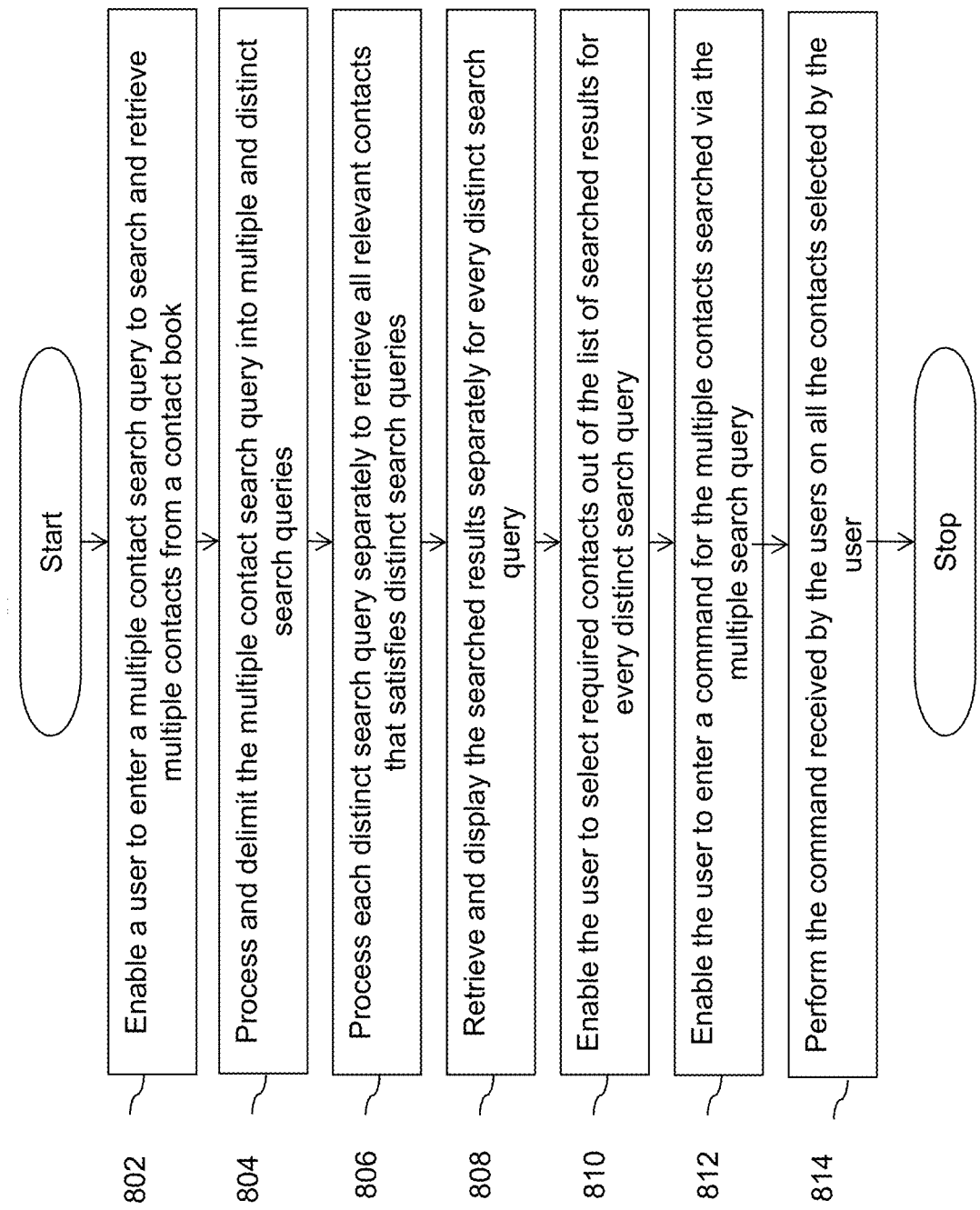

SYSTEM AND METHOD FOR ENHANCING SEARCH EXPERIENCE OF A USER OF A COMMUNICATION DEVICE

BACKGROUND

1. Field of the Invention

The invention relates to search and retrieval technologies. More specifically, the invention relates to the use of special characters in the search strategies to enhance the search experience of the users of communication devices.

2. Description of Related Art

Generally, in communication devices, the users of the communication devices are required to search for the contacts to which the user needs to communicate. Therefore, every time a user needs to communicate with a person, the user needs to manually type a search string in the phonebook of his/her communication device to retrieve the contact details of a required person.

Further, many times there are cases where a user needs to send one message to multiple recipients. In such cases, the user gets bound to repeat the procedure of searching and adding recipient's contact details in a recipient list. This may be an exhausting and uninteresting job for many people. Also, this may consume a lot of precious time of the users of the communication devices.

Currently, there exist solutions in communication devices, where the user can search contacts by pressing few digits/numbers/alphabets of the person whom the user wants to call or message. For example, the user can search the contacts if he/she remembers few digits of the phone number of the person whom he/she wants to contact. Similarly, the user can search the contacts by entering few alphabets of the person. Thus, after receiving such inputs, the device populates the screen of the communication device with the possible matches and then provides the user with the list of contacts which matches the desired query.

However, if the user want to establish a conference call or if the user want to have a call with more than one calling party, then the user may have to search for contacts separately one by one and then connect the desired candidates in a conference call. This may even keep the other party on hold. Moreover, the current solutions are manual processes that require a user to search for each contact one at a time. Then the communication channel may be established one at a time by keeping one or more parties on hold before establishing a communication channel. This may again be a time consuming and exhausting work for many people. Also, as the current solutions are manual, therefore risk of human errors in the work will always be present.

Therefore, there is a need for improvement in the search and retrieval technology to make the searching experience of the users more interesting, more interactive and less time consuming. Furthermore, there is a need of a system and corresponding method to display the searched results in a user friendly manner.

SUMMARY

Embodiments in accordance with the present invention provide a system for searching multiple contacts through a single query. The single query may include multiple sub-queries. Further, the system may include a delimiter module configured to divide the single query into multiple sub-queries based on predefined rules. Furthermore, the system may include a parser module configured to search for multiple contacts corresponding to each of the multiple sub-queries. Again further, the system may include a display module configured to display the multiple contacts corresponding to the multiple sub-queries.

In another embodiment, the present invention provides a computer-implemented method of searching multiple contacts in a single query having multiple sub-queries. Further, the method of searching multiple contacts may divide the single query into multiple sub-queries based upon predefined rules. Furthermore, the method of searching multiple contacts may search for multiple contacts corresponding to each of the multiple sub-queries. Again further, the method of searching multiple contacts may display the multiple contacts corresponding to the multiple sub-queries.

In yet another embodiment, the present invention provides a computer-readable medium having instructions executable by a processor to divide a single query into multiple sub-queries based upon predefined rules. Further, the instructions executable by the processor may search for multiple contacts corresponding to each of the multiple sub-queries. Furthermore, the instructions executable by the processor may display the multiple contacts corresponding to the multiple sub-queries.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein:

FIG. 5 illustrates a data storage structure for storing contact information retrieved from a database as a response to a search query, in accordance with an embodiment of the invention;

FIG. 8 illustrate a flow diagram of a method to search multiple contacts using a single query and provide a 'User Interface' that provides the user with multiple search results, in accordance with an embodiment of the present invention.

Figure 1:
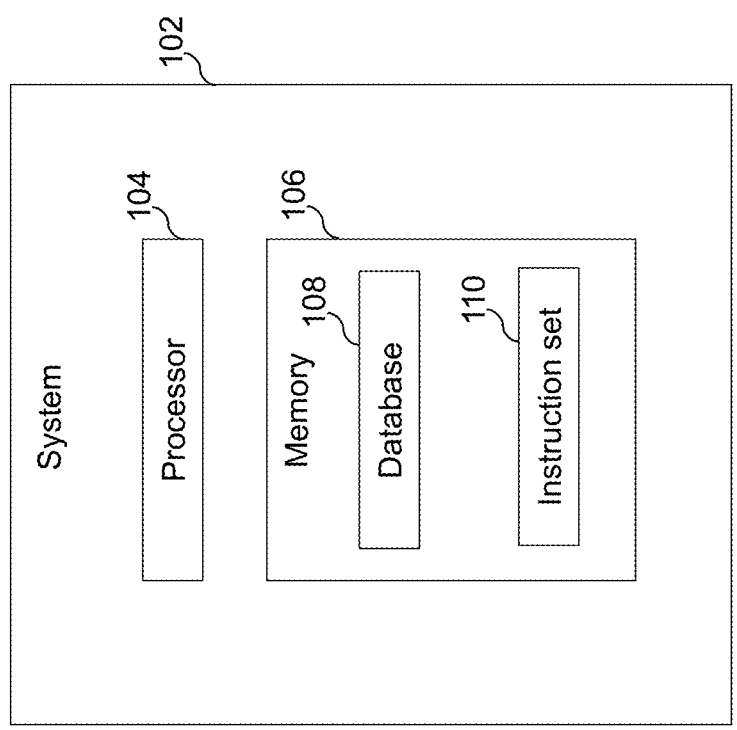
FIG. 1 illustrates exemplary block diagram of a system for supporting searching and retrieval of multiple contacts from a contact list by using a single query, in accordance with an embodiment of the present invention.

The headings used herein are for organizational purposes only and are not meant to be used to limit the scope of the description or the claims. As used throughout this application, the word $^{may}$ is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

Illustrative embodiments of the invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

FIG. 1 illustrates exemplary block diagram of a system 102 for supporting searching and retrieval of multiple contacts from a contact list by using a single query, in accordance with an embodiment of the present invention. In an embodiment, the system may be implemented as a software/firmware that can be installed in any electronic device. In another embodiment, the system may be implemented as a communication device. Examples of communication device include but are not limited to a mobile phone, a smart phone, a Personal Desktop Assistant (PDA), a tablet Personal Computer (PC), and so forth.

Communication device may be used for communication such as data and voice communications over a Public Switched Telephone Network (PSTN), cellular network, the Internet, the Ethernet, and so forth. In an embodiment of the invention, communication device may include an Operating System (OS) such as, but not limited to, Windows Mobile, Apple iOS, Google Android, Symbian, and so forth. In another embodiment, the communication device may be a basic electronic device with firmware instructions only.

The system 102 includes a processor 104 and a memory 106. The memory 106 includes a database 108 and an instruction set 110. The database 108 may store a list of contacts. Every contact may represent certain contact information that can be used by the system 102 to establish communication with a communication device (that may be owned by the contact person). Further, the contact information may include, name of the contact person, address of the contact person, e-mail address of the contact person, and more. In an embodiment, the contact information may be numeric, alphanumeric, or may be a string only. In another embodiment, the contact information may also be graphical information.

Further, the memory 106 includes an instruction set 110. In detail, the instruction set 110 is explained further in conjunction with the FIG. 2 of the invention. Broadly, the instruction set 110 may include one or more instructions that may be executed by the processor 104 to process/execute various queries that can be received from the user of the system 102. The query/queries may be intended (by the user) in search of one or more contacts (from the list of the contacts) stored in the database 108, i.e. a query may correspond to an instruction received from a user of the system 102 to search for one or more particular contacts from the contact list (stored in the database 108). Further, a query may include one or more sub-queries. Each sub-query may be intended (by the user) in the search of a particular contact (single contact) stored in the database 108.

Further, the query may include special characters that may be used to separate the multiple sub-queries (present in the query) from each other. Therefore, the system 102 may store instructions executable by the processor 104 (in the instruction set 110) that may enable the system 102 to recognize the special characters present in the query. Further, the instructions may enable the system 102 to identify each sub-query separately with the help of the special characters. The special characters may be any characters that can be easily distinguished from the general characters used in any language. Also, the special characters can be the characters that are generally not used in any search queries.

Additionally, the instruction set 110 may include instructions executable by the processor 104 to process/execute each sub-query separately. Also, the instructions may enable the system 102 to combine the results of the sub-queries in a manner that may be suitable to the single query received from the system. Also, the results may be displayed to the user, in a user friendly manner. In an exemplary embodiment of the invention, the processing, searching, retrieval, and display of the queries received from the user, can be performed by various modules that are explained further in conjunction with the FIG. 2 of the invention.

Moreover, the instruction set 110 may include instructions executable by the processor 104 to receive and process a command received from the user of the system that is required to be executed on the results of the query processed by the system 102. The command may correspond to any instruction given by the user of the system that needs to be executed on the contacts retrieved from the query (contact search query) given by the user. Processing of the commands is illustrated and explained further in conjunction with the FIG. 6 of the invention.

Figure 2:
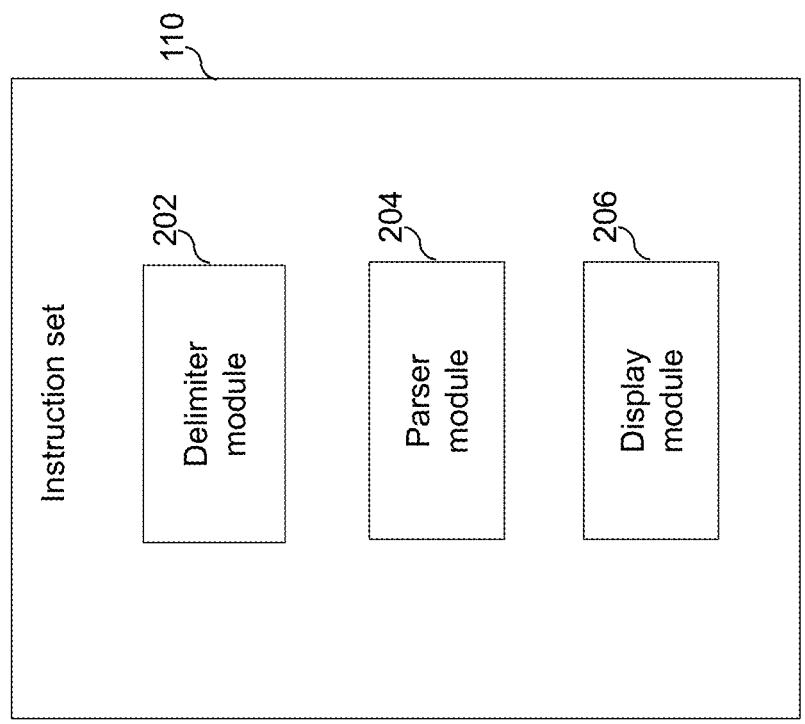
FIG. 2 illustrates exemplary block diagram of an instruction set for processing a 'multiple contact search' query received from a user of the system, in accordance with an embodiment of the present invention.

FIG. 2 illustrates exemplary block diagram of an instruction set, such as instruction set 110, for processing a 'multiple contact search' query received from a user of the system 102, in accordance with an embodiment of the present invention. The instruction set 110 includes various modules for processing the multiple contact search query, such as, but are not restricted to, query delimiter module 202, query parser module 204, display module 206. The query delimiter module 202 (hereinafter, may be referred to "module 202") may receive a query from the system 102. The module 202 may then analyze the query to search for the special characters. In an embodiment, the special characters may also include 'wild-cards' that can be used in the search query. The concept of the wild-cards is explained further in conjunction with the FIGS. 4 and 6 of the invention.

In an embodiment, the special characters may be pre-fixed by the system 102, i.e. the user of the system 102 must be aware of the pre-fixed characters that the system can recognize as the special characters. Further, the system 102 may allow the user to use more than one type of special characters. In an embodiment, the module 202 (of the system 102) may consider all different types of special characters as similar characters (i.e. with similar functional purpose). In another embodiment, the module 202 may consider different special characters for different processing functionalities (i.e. with different functional purpose). For example, if the pre-fixed special characters are "?" and "*", then the occurrence of such characters (in the query) may either indicate same meaning to the module 202, or may indicate different meaning to the module 202.

In another embodiment, the special characters may not be pre-fixed by the system 102. The module 202 (of the system 102) may be configured to identify all symbols, those are neither of numerical significance, and nor have any alphabetical resemblance. Such characters may be considered as the special characters by the module 202. Further, the module 202 can also be configured to test the syntax of the query to confirm if the recognized character can function as the special character or not. If the module 202 recognized occurrence of any character as meaningless, then the module 202 may ignore the character by considering it as input mistake and may test the rest of the query again. This process can be repeated until the module 202 gets sure if the query is syntactically correct, or have bugs.

Further, after processing of the query received from the user of the system 102, the module 202 may pass the gathered information to the query parser module 204 (hereinafter, may be referred to as "module 204"). In an embodiment, the module 202 may inform the module 204 corresponding to the position and type of the special characters identified in the query. In another embodiment, the module 202 may divide the query into multiple sub-queries based on the occurrence of the special characters. Further, the module 202 may pass the separated sub-queries to the module 204 for searching and retrieval of the results.

Thereafter, the module 204 may process/execute each sub-query separately to get required results. For example, if the query has 3 special characters, then the module 204 may retrieve 3 different contact details from the database 108. Also, the module 204 may consider the wild-cards (if used in the query) while processing the query. The use of the wild-cards is well known to the person skilled in the art.

Furthermore, after processing of the query based on the information received from the module 202, the module 204 may pass the retrieved results to the display module 206 (hereinafter, may be referred to as "module 206"). The module 206 may then analyze (or may use pre-determined information) the display screen's size (not shown) and screen's resolution of the system to determine the way of displaying the retrieved information to the user in a user friendly fashion. The two possible ways (but not limited ways) of displaying results in a big display screen and small display screen devices are illustrated in the FIGS. 6 and 7 of the invention, respectively.

Figure 3:
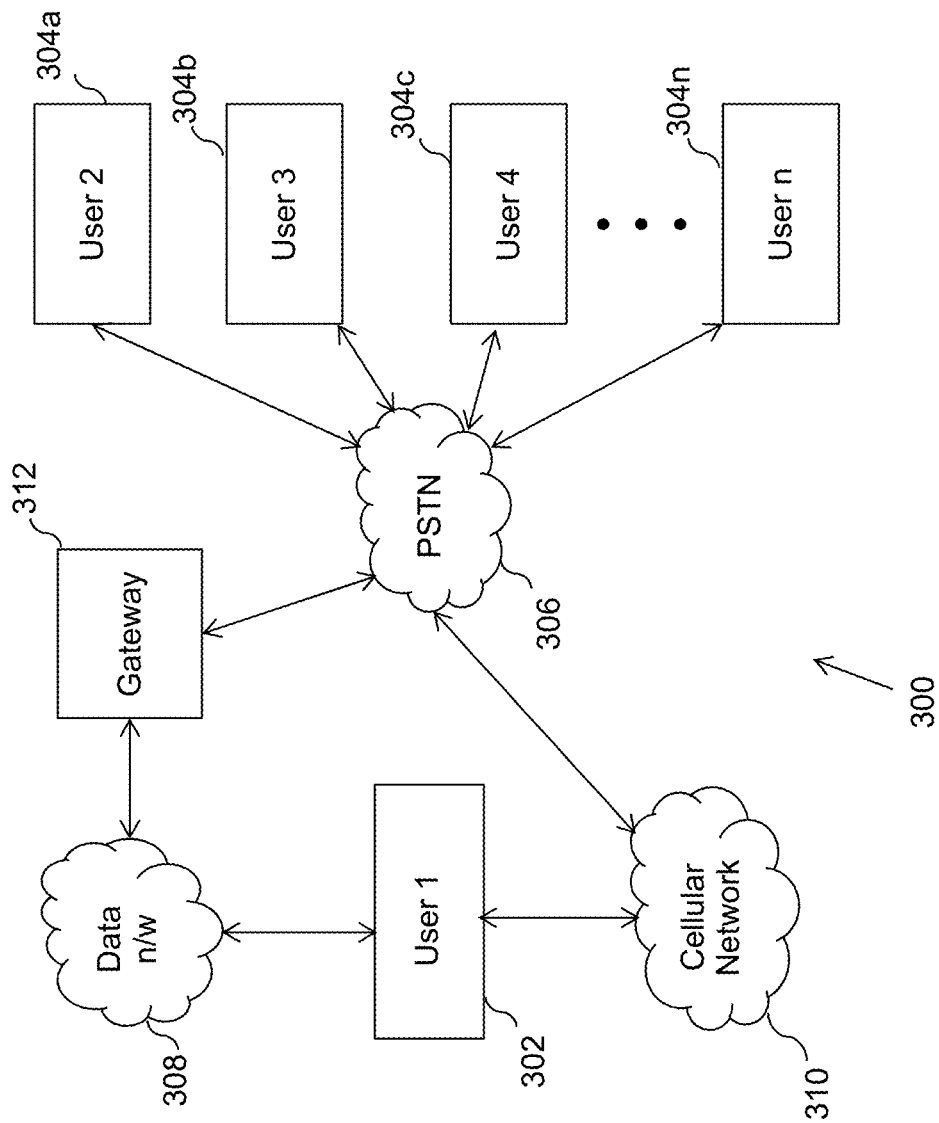
FIG. 3 illustrates an exemplary environment where various embodiments of the invention may function.

FIG. 3 illustrates an exemplary environment 300 where various embodiments of the invention may function. As shown, communication device 302 of a user 1 (hereinafter, may be referred to as "user 302") is in communication with various other users (of communication devices) present in the environment 300. The other users are user 2 (304a), user 3 (304b), user 4 (304c) . . . user 'n' (304n). Examples of communication device include but are not limited to a mobile phone, a smart phone, a Personal Desktop Assistant (PDA), a tablet Personal Computer (PC), and so forth.

In an embodiment, the user 302 can be in communication with the other users 304a, 304b . . . 304n through PSTN 306, via network 308 or the cellular network 310. In another embodiment, the user 302 may be in communication with the users 304a, 304b . . . 304n (hereinafter, may be referred to as "user 304") directly via the cellular network 310 (not shown). In yet another embodiment, the user 302 may be in communication with users 304 via data network 308 (such as Internet or LTE). Also, a gateway 312 can be used in case if the user 302 needs to communicate with users 304 through PSTN 306, via the data network.

Further, the communication shown between the user 302 and the users 304 may be communication of messages, emails, voice calls, video calls, conference calls etc. In an embodiment, the system 102 may be a part of the communication device owned by the user 302. Further, the system 102 may enable the user 302 to send any message such as SMS, MMS, or e-mail to one or more of the users 304 by adding their contact details in a recipient list (in his/her communication device) by using special characters to create the 'multiple contact search' query (as explained previously in conjunction with the FIGS. 1 and 2 of the invention). The multiple contact search query may enable the user 302 to search for more than one contact in a phonebook (of a communication device) via a single query only. This may enable the user to skip the recursive procedure of searching one recipient contact detail at a time in case of sending a message to multiple recipients.

Furthermore, in case of adding multiple recipients into a conference call, the user 302 can make the 'multiple contact search' query for searching and retrieving all the queried contacts from a phonebook. For example, if the user 302 wants to initiate a conference call with user 304b and user 304c, then the user 302 can make the suitable 'multiple contact search' query that will automatically retrieve the contact details of the users 304b and 304c, in one go. Thereafter, the user 302 may give a command to add all the queried recipients into a conference call. The communication device of the user 302 may then follow a (pre-stored) generic procedure of adding multiple recipients into a conference call. This reduces human intervention and efforts, and hence makes any procedure convenient and faster for the user of a communication device.

Additionally, the communication device of the user 302 may enable the user to use wildcards for searching contacts stored within the phonebook of the communication device. The wildcards may provide certain privileges to user in performing search for the contacts. The privileges may ease the efforts of the user to search desired contacts. The wildcards and the associated privileges are explained further in conjunction with the FIG. 4 of the invention.

Figure 4:
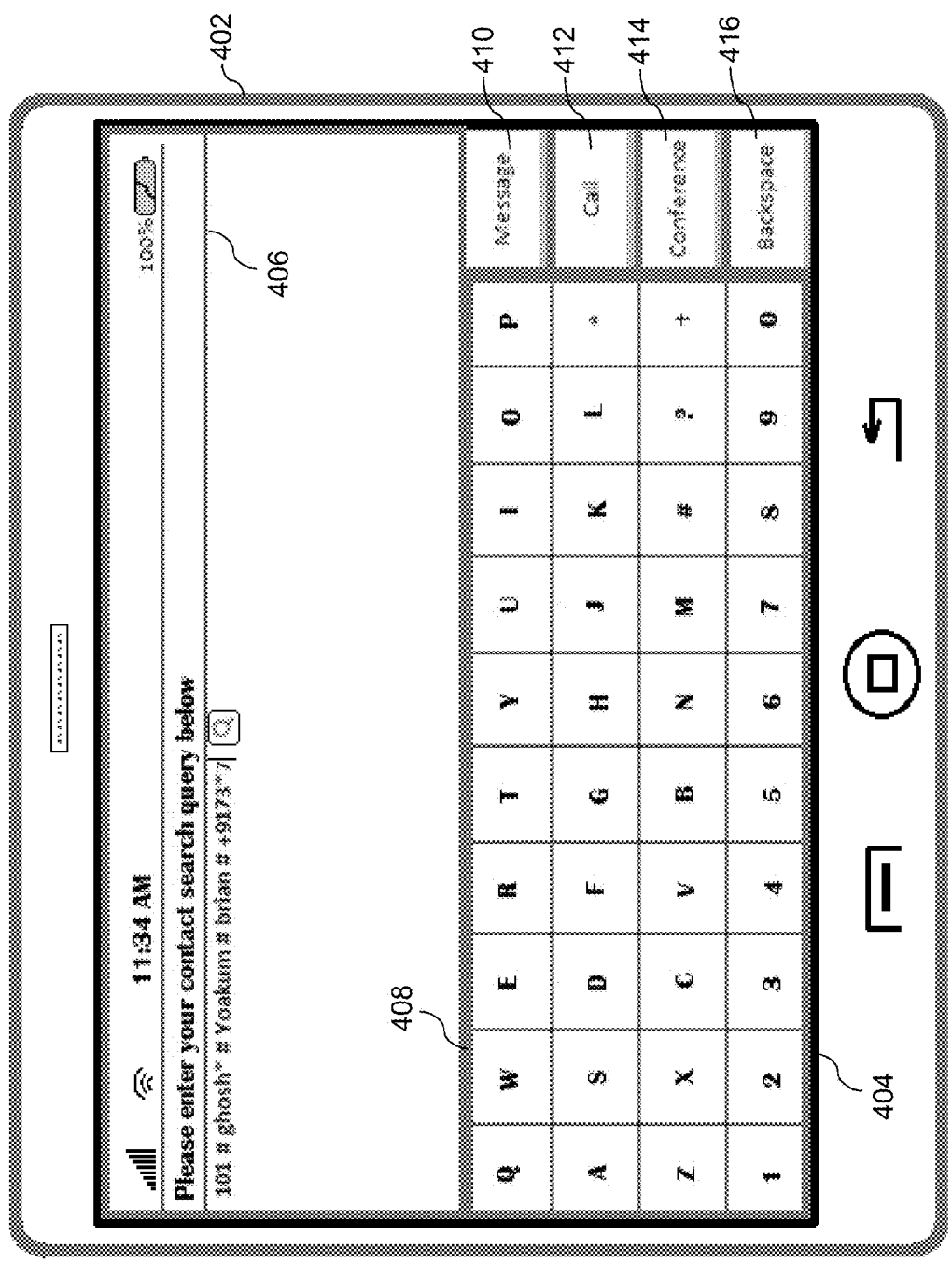
FIG. 4 illustrates a phonebook wizard displayed at a display screen of a communication device, in accordance with an embodiment of the present invention.

FIG. 4 illustrates a phonebook wizard (user interface) displayed at a display screen of a communication device 402, in accordance with an embodiment of the present invention. In an embodiment, the system, such as system 102 (as described in previously in conjunction with FIGS. 1 and 2 of the invention) may be implemented as the communication device. In another embodiment, the system 102 may be a part of the communication device. In yet another embodiment, the system may be installed as a software application in the communication device. It still another embodiment, the system may be implemented as an operating system of the communication device. Examples of communication device include but are not limited to a mobile phone, a smart phone, a Personal Desktop Assistant (PDA), a tablet Personal Computer (PC), and so forth.

Further, as shown, the communication device 402 (hereinafter, may be referred to as "device 402") includes a display screen 404 having displayed therein a phonebook wizard/application/UI. The phonebook may also be referred to as contact book of the communication device in which the user of the device 402 may store contact information of desired persons. Further, the phonebook wizard includes an area 406, where the user may enter the multiple contact search query (as described previously in conjunction with FIGS. 1, 2, and 3 of the invention) in order to retrieve one or more contact details of desired persons.

Furthermore, the user may make use of the virtual keyboard 408 displayed on the display screen 404 to input the multiple contact search query for the device 402. It may be appreciated by a person skilled in the art that the use of the virtual keyboard is not mandatory for the invention scope, and any kind of input method may work to input the search query to the device 402. Also, the use of the virtual keyboard is just for the illustration of an embodiment of the invention on a touch based communication device. Further, as shown, a query is entered in the area 406. The user may use a search button shown adjacent to the end of the query to initiate the search of contacts. The results of the searched query are illustrated in conjunction with FIG. 6 of the invention.

As shown, the display screen 404 of the device 402 includes certain command buttons, such as button 410, 412, 414, and 416. It may be appreciated by the person skilled in the art that the buttons illustrated in the figures are not meant to restrict the scope of the invention, indeed illustrates possible embodiments of implementing the invention. Further, the button 410 illustrates a message button that may be used by the user of the device 402 to send a message to multiple recipients in one go by using the multiple contact search query. Similarly, the button 412 may be used to call the searched contacts, and the button 414 may be used to add multiple contacts into a conference call automatically without human effort and intervention. Additionally, the button 416 may be used to delete any inputted text on the device 402.

In an exemplary embodiment of the invention, the phonebook wizard illustrated in the FIG. 4 is capable of searching multiple contacts, simultaneously, using a single query. Further, the phonebook wizard represents a 'User Interface' that is capable of providing the user of the device 402 with multiple search results by executing the single query. The single query can be a merger of distinctive queries in different formats. Also, the query can be a digit based query and/or a name based query. In an exemplary embodiment of the invention, the user of the device 402 may use certain special characters, such as, pound (#) or Asterisk (*) in the search query in order to merge several elementary search queries.

For example, the user may enter one search query for one contact and then may use a special character, thereafter the user may enter second search query for second contact and may then enter the special character again if the user need to search for a third contact. The user may use the special character 'n' times in order to search for 'n' number of contacts from a contact book. Additionally, while processing a multiple contact search query, the device 402 may start scanning the query from beginning and may stop after identifying a special character to complete the search for the analyzed query. In order to perform the search, the device 402 may match the contacts details (stored in the device) with the inputs provided (by the user of the device) till occurrence of a special character. Thereafter, the device 402 may repeat the same procedure to scan query after the first occurred special character till the next special character, and so on. Therefore, the user can enter a predefined number of separate queries in a single search query, and thus a list of all such query may be populated in a single screen. In an embodiment, the different search query results may be displayed in different columns.

Further, if the displayed results are too many to be displayed on a single display screen, then the device 402 may allow the user to use scroll bars to view hidden results. The user can then scroll down the contacts in different columns and can select the preferred contact. A check box may be provided against each contact in order to allow the user to select desired results only. Thereafter, the user may press any of the buttons 410, 412, or 414 to perform related actions on the searched contacts. In case, if the user selects button 414, then the communication device may start establishing the communication channel with searched contacts. After establishment of the communication with one party, the established party may be able to hear from the user and other established parties. The searched contacts may keep on getting added in the conference call as soon as they get connected.

FIG. 5 illustrates a data storage structure 500 for storing contact information retrieved from a database as a response to a search query, in accordance with an embodiment of the present invention. The search query is the query illustrated in the area 406 of the FIG. 4 of the invention. The search query includes the special character "#" and a wild card character "*". Further, based on the use of the special character "#", the query is divided into five sub-queries. The first sub query is illustrated in the column 502 of the data storage structure 500 of FIG. 5 of the invention. Similarly, the second, third, fourth, and fifth sub query is illustrated in the columns 504, 506, 508, and 510 of the data storage structure 500 of the FIG. 5 of the invention.

Further, the rows 512, 514, 516, and 518 of the data storage structure 500 illustrate the number of results retrieved for every sub query illustrated in the structure 500. As shown, in the column 502, the sub query includes digits '101'. Therefore, the system, such as the system 102 of the device 402 (as shown in FIG. 4) may have searched for all the contacts (stored in its database or phonebook) that include '101' digit in the contact number or in the contact name (stored in its database or phonebook). Thereafter, the system may have retrieved all the names of the contacts (stored in the database or phonebook) that have an entry of '101'. For example, result 1, result 2, and result 3 of the column 502 represents the contact numbers those have '101' in them.

As shown in the column 504, the sub query includes alphabets with a wild card character 'Ghosh*'. Therefore, the system may have searched for all the entries in its phonebook with such characters. The inclusion of wild card refers to any number of characters prefix or postfix with the characters inputted by the user. Hence, the system has retrieved the list of names with 'Ghosh' as prefix or postfix, as shown in the results 1, 2, 3, and 4 of the column 504. Further, as shown in the column 506, the sub query includes a word 'Yoakum'. Therefore, the system has retrieved all the contacts having the word 'Yoakum', as shown in the result 1 and result 2 of the column 506. Similarly, as shown in the column 508, the results 1, 2, and 3 show all the contacts having the word ('Brian'). Further, as shown in the column 510, the sub query includes multiple digits and then a wildcard character i.e. '+9173*7'. Therefore, the system may have searched for the contacts starting from +9173 and ending with the digit '7' and the results are shown in the result 1 and result 2 of the column 510.

Figure 6A:
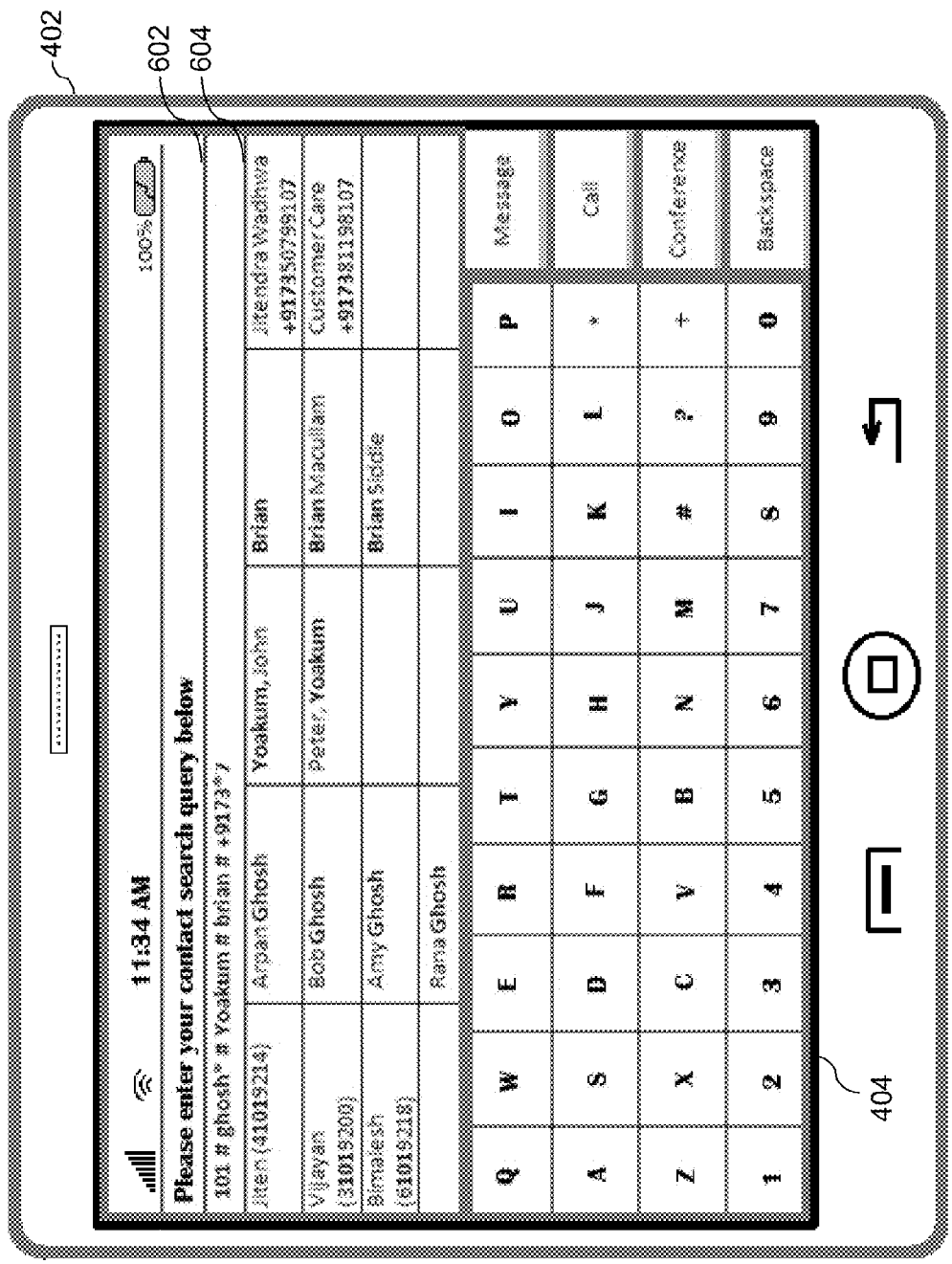
FIGS. 6A and 6B illustrate functioning of the phonebook wizard displayed at a display screen of a communication device, in accordance with an embodiment of the invention.
Figure 6B:
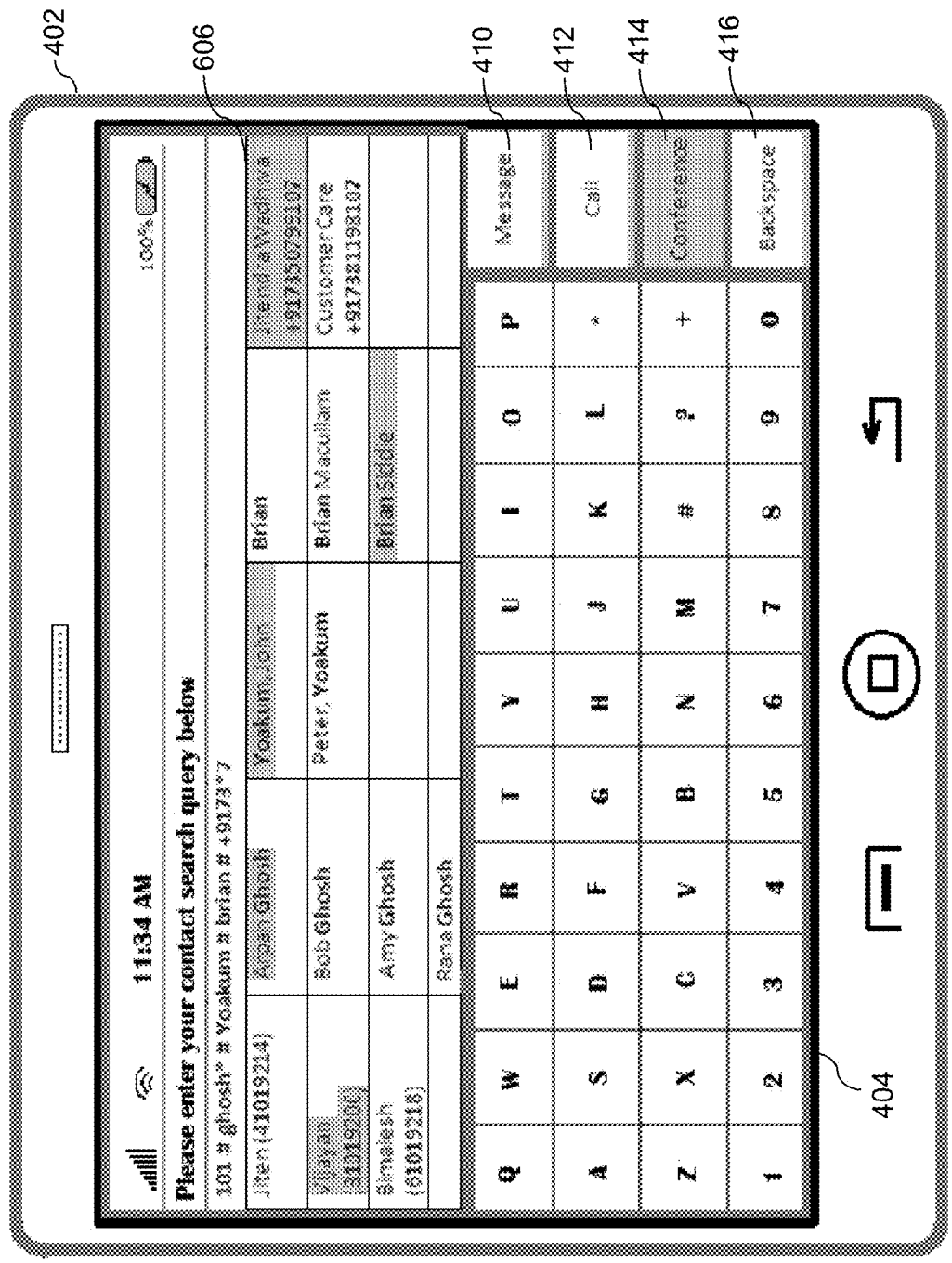

FIGS. 6A and 6B illustrate functioning of the phonebook wizard (as shown in FIG. 4) displayed at a display screen of a communication device 402, in accordance with an embodiment of the invention. FIG. 6A illustrates the device 402 having the display screen 404. The display screen further includes an area 602, where the query searched by the user of the device 402 is displayed. Further, the display screen includes an area 604 where the results retrieved by the device 402 (corresponding to the searched query) are displayed in a user friendly manner. Furthermore, the results are displayed in the five different columns. Every column includes results retrieved for a particular sub query.

In an embodiment, the searching, retrieval, and display of the results may be simultaneous, i.e. the device may keep populating the display screen of the device 402 as soon as any result for any sub query is determined. In another embodiment, the device may search and display the queried contacts simultaneously with the inputs given by the user while typing a search query, i.e. the device may not wait for the user to press search button to display results.

FIG. 6B illustrates the device 402 having the display screen 404. The display screen further includes an area 606, where the query searched by the user of the device 402 is displayed and marked by the user of the device 402. The highlighted portions shown in the area 606 illustrates that the user of the device has marked the required contacts. The contacts that are not marked/highlighted may be discarded by the system. Further, the user of the device 402 has the options of the command buttons 410, 412, and 414. The user may press any of the aforementioned buttons to either message or call the marked/highlighted contacts. The device 402 may automatically perform the required action on the marked contacts, and the user may need not to perform the manual work required for the same.

In an embodiment, area 606 may be configured to allow for a simultaneous selection of multiple contacts by locking into a selected state the selected contacts in a list populating area 606, as shown in FIG. 6B. This is to avoid a scenario in which the screen may not allow selection of multiple contacts. The selection may be indicated on screen, for instance by way of a checkbox beside each of the populated contacts.

Area 606 may be further configured or manipulated to allow display and/or selection of additional contacts. For example, a row and/or column of the populated contacts in area 606 may be shrunken (e.g., a thinner column or flatter row) or hidden upon user control. Manipulation of area 606 in this way may accommodate more selection rows and/or columns in area 606, and allow a user to avoid scrolling through the screen.

Embodiments in accordance with the present invention may further use a portion of display screen 404, such as a separate row or column of area 606, such that contacts selected by the user may remain displayed. This will ensure that if a selected contact is not visible on the screen due to lack of space for the number of contacts, then the user may view the portion of display screen 404 to identify if all the user's desired contacts have been included. The user may also delete a contact directly from the portion of display screen 404. The user may even press and hold a contact selected from the populated list in area 606 in order to drag and drop the selected contact into the portion of display screen 404.

Figure 7:
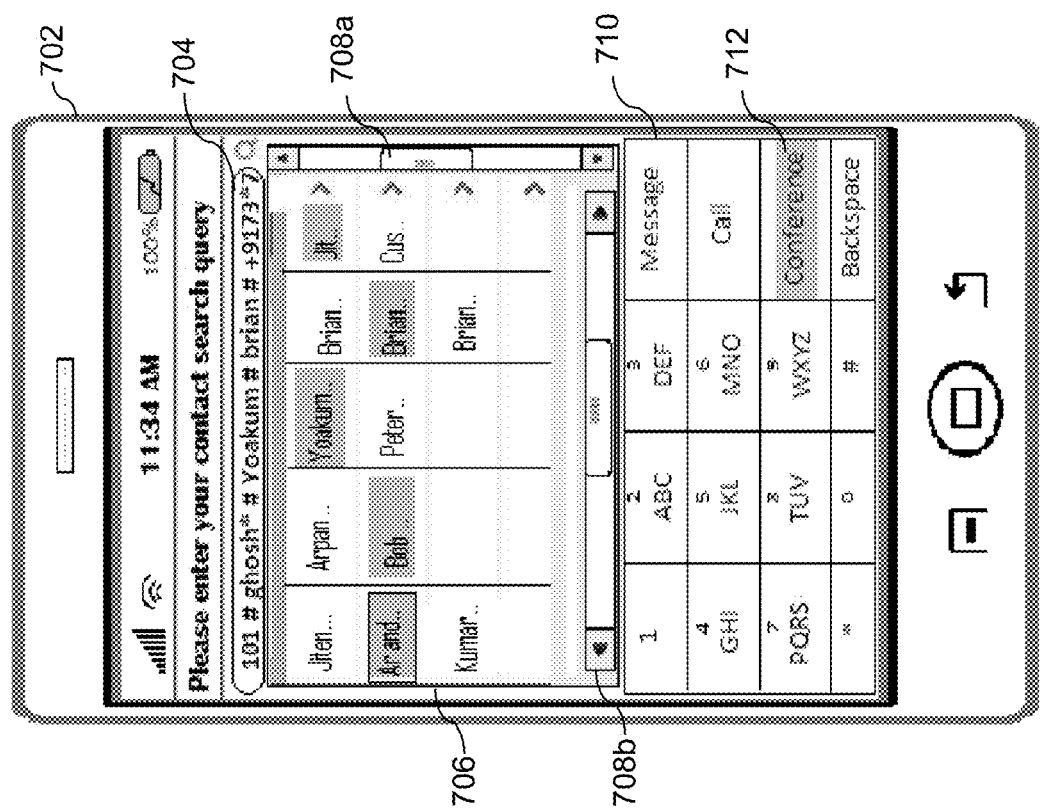
FIG. 7 illustrates a phonebook wizard displayed at a display screen of a communication device, in accordance with another embodiment of the invention.

FIG. 7 illustrates a phonebook wizard (user interface) displayed at a display screen of a communication device 702, in accordance with another embodiment of the invention. In an embodiment, the system, such as system 102 (as described in previously in conjunction with FIGS. 1 and 2 of the invention) may be implemented as the communication device. In another embodiment, the system 102 may be a part of the communication device. In yet another embodiment, the system may be installed as a software application in the communication device. It still another embodiment, the system may be implemented as an operating system of the communication device. Examples of communication device include but are not limited to a mobile phone, a smart phone, a Personal Desktop Assistant (PDA), a tablet Personal Computer (PC), and so forth.

Further, as shown, the communication device 702 (hereinafter, may be referred to as "device 702") includes a display area 704 having displayed therein a search query for retrieval of multiple contacts from the phonebook of the device 702. The phonebook may also be referred to as contact book of the communication device in which the user may store contact information of desired persons. Further, the device 702 includes an area 706, where the results retrieved by the device 402 (corresponding to the searched query) are displayed in a user friendly manner. Furthermore, the results are displayed in the five different columns. Every column includes results retrieved for a particular sub query.

Also, as shown, the size of the display of the device 702 is smaller in comparison to the display screen of the device 402 (as shown in the FIG. 4 of the invention), thus it is difficult to display the grouped results (sub-query wise) column wise in the device 702. Therefore, as shown, the device 702 has shrunk the displayed results by displaying only the initial letters of the results and by hiding the rest of the letters to ensure visibility of all the columns on the display screen. In an embodiment, if the number of columns is too large to be displayed on a display screen, then the device 702 may enable the user to navigate to all the rows and columns by using the scroll bars 708a and 708b. This way the user of the communication device 702 gets able to view 'n' number of results in a user friendly manner.

FIG. 8 illustrate a flow diagram of a method to search multiple contacts using a single query and provide a 'User Interface' that provides the user with multiple search results, in accordance with an embodiment of the present invention. The method may be understood more clearly when, the description corresponding to the method, is read in conjunction with FIGS. 3, 4, 5 and 6. The order in which the method is performed is not intended to be construed as limitation, and further any number of the method steps may be combined in order to implement the method or an alternative method without departing from the scope of the invention.

At step 802, a user of a communication device provides a 'multiple contact search' query (single query) to a system, such as the system 108 (as described previously in conjunction with FIGS. 1 and 2). In an embodiment, the system may be implemented as the communication device. In another embodiment, the system may be implemented as a part of the communication device. In yet another embodiment, the system may be installed as a software application in the communication device. It still another embodiment, the system may be implemented as an operating system of the communication device.

The 'multiple contact search' query may enable the user of the communication device to search for more than one contact in its phonebook via a single query (multiple contact search query) only. This may enable the user to skip the recursive procedure of searching one recipient contact detail at a time in case of performing any action on the multiple contacts. Further, the single query can be a merger of distinctive queries in different formats. Furthermore, the query can be a digit based query and/or a name based query.

In an exemplary embodiment of the invention, at step 804, the query may be provided as an input to the contact search 'User Interfaces' of the communication devices. The user interfaces may then process/execute the query in search for certain special characters, such as, but not restricted to, pound (#) or Asterisk (*). The special characters may help the communication devices to distinguishably identify the merged sub-queries in a 'multiple contact search' query. This may be referred to as delimiting of the query based on the occurrence of the special characters in the query. Also, this step may be performed by the query delimiter module 202 of the system (as described previously in conjunction with FIG. 2 of the invention)

Further, at step 806, for each identified sub-query, the communication device may perform a search for the retrieval of the required contact information that may be stored in the phonebook/contact-book of the communication device. The communication device may use the query parser module 204 (as described previously in conjunction with the FIG. 2 of the invention) to perform this step. Here, the sub-queries are analyzed and executed individually by the communication device. The communication device may also consider use of the wildcards in the sub-queries to perform the search accordingly. The use of the wildcard is illustrated in conjunction with FIG. 6 of the invention. Also, the use of the wildcards in the search queries in known to the person skilled in the art.

At step 808, the communication device may analyze the results retrieved at the step 806 to analyze the most suitable display arrangement for the searched results. The display arrangement may also vary according to the size of the display screen of the communication device. Also, the display arrangement may vary according to the screen resolution of the communication device. This step may be performed by the display module 206 (as described previously in conjunction with FIG. 2 of the invention). The retrieved results may either be displayed consecutively in columns or in rows, where every column/row may have results related to a single sub-query only.

At step 810, the user of the communication device may be scan the results retrieved and displayed in the columns/rows. In an embodiment, if a sub-query retrieved more than one result, then the user may see those results in a single column/row. Also, the communication device may display the associated sub-query along with the set of results retrieved for the query. This may allow the user to easily select the required contacts out of the list of contacts suggested by the communication device. In an embodiment, the communication device may add a check box with every retrieved contact. The user may then be facilitated to check mark all the required contacts. The communication device may then select the check marked contacts and may ignore the rest of the retrieved contacts.

At step 812, the user of the communication device may be facilitated to provide a command that needs to be executed on the contacts selected by the user. In an embodiment, the command may correspond to send a message to the selected contacts. In another embodiment, the command may correspond to send an email to the selected contacts. In yet another embodiment, the command may correspond to add the selected contacts into a voice/video conference call. Thereafter, at step 814, the communication device may perform the command received from the user onto the contacts selected by the user. Further, the communication device may also show the results of the command execution to the user of the communication device.

Figure 9A:
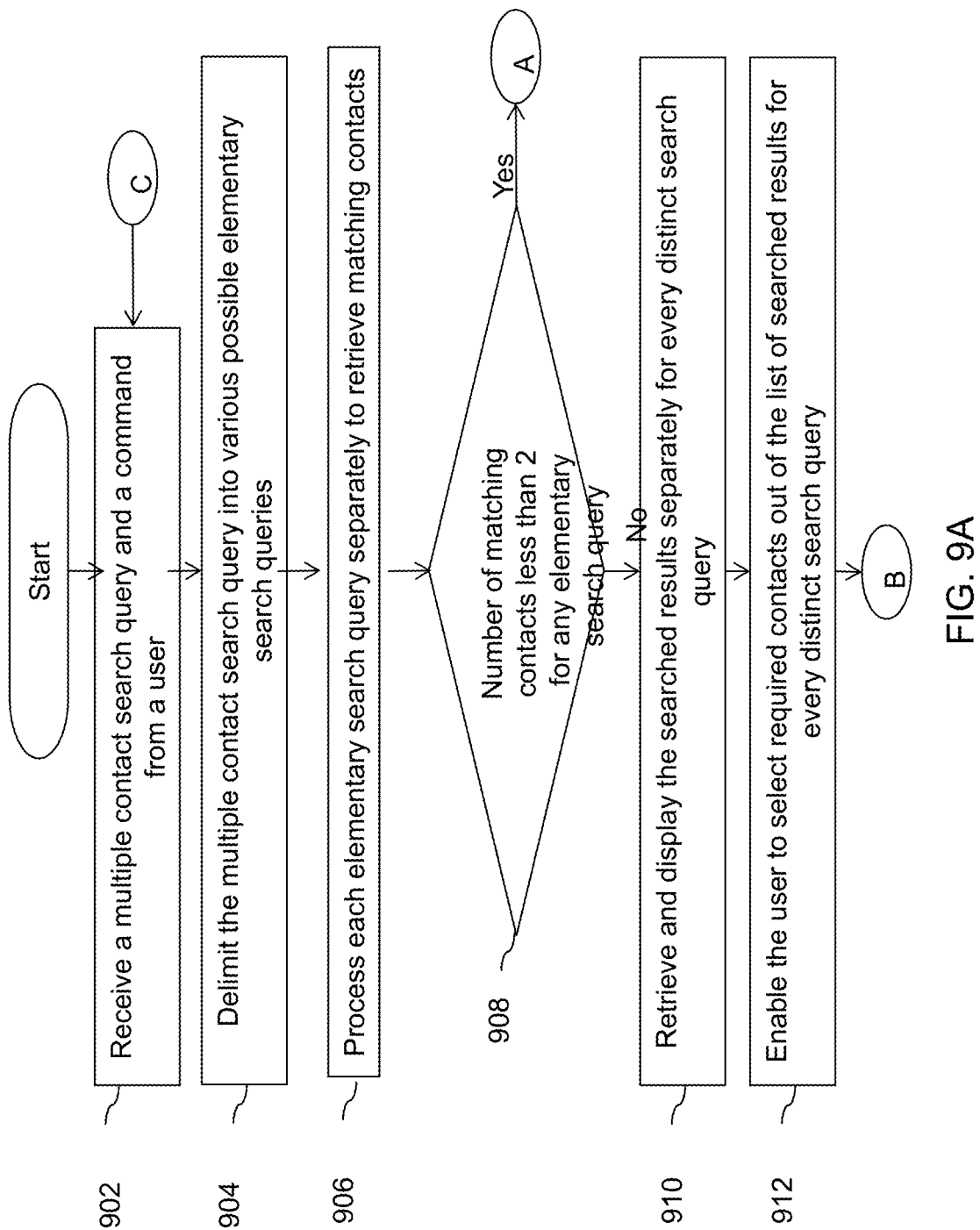
FIGS. 9A and 9B illustrate a flow diagram of a method to search multiple contacts using a single query and to display corresponding results in a user friendly manner, in accordance with an embodiment of the present invention.
Figure 9B:
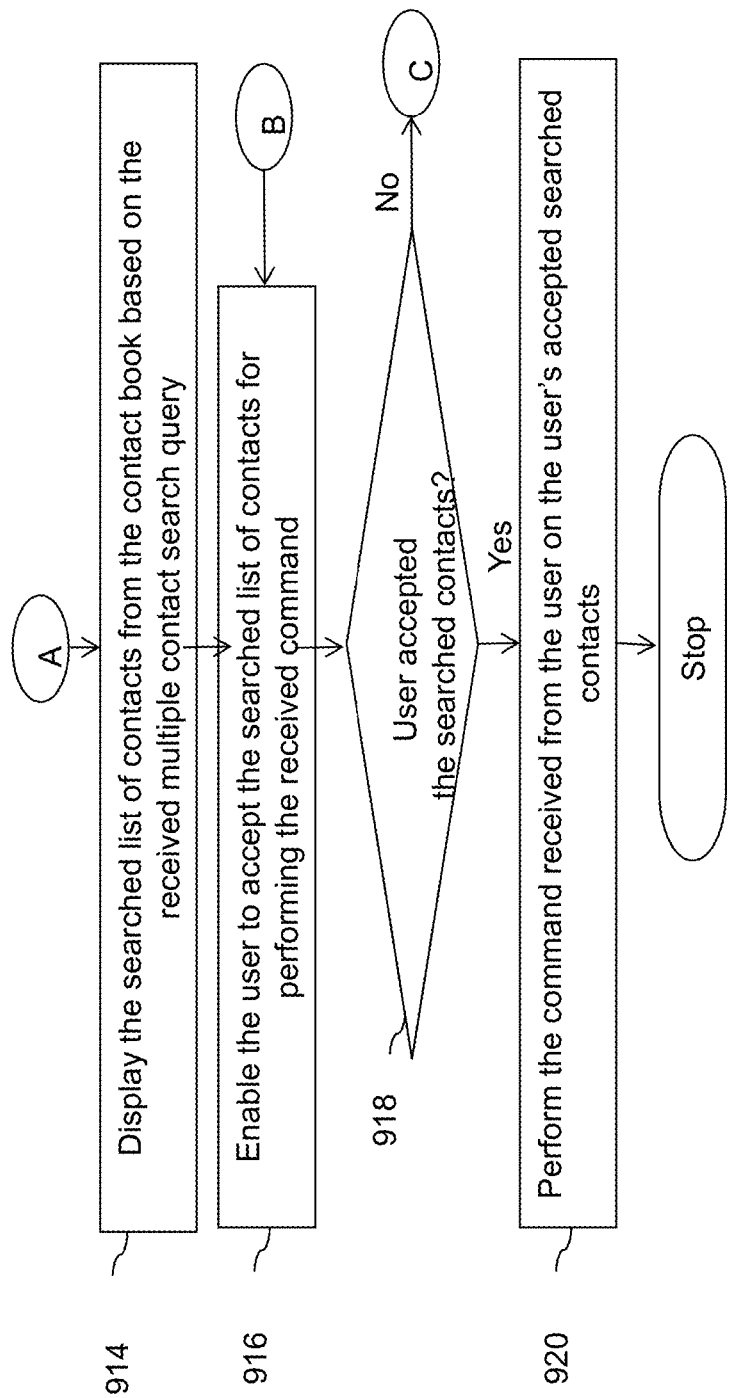

FIGS. 9A and 9B illustrate a flow diagram of a method to search multiple contacts using a single query and to display corresponding results in a user friendly manner, in accordance with an embodiment of the present invention. At step 902 (as shown in the FIG. 9A of the invention), the communication device of a user receives a 'multiple contact search' query (single query) from the user. Further, the user of the communication device may also provide a command or instruction that is needed to be executed on the results of the query (received from the user).

At step 904, the communication device of the user may process/execute the query received from the user in order to analyze if the query received is an elementary query or is formed from more than one queries. This may be recognized (by the communication device) by determining presence of certain special characters in the query. The special characters may be used by the user while preparing the query for the communication device. Further, the communication device may use these special characters in order to delimit the query into various possible elementary search queries.

Further, at step 906, the communication device may perform a search separately, for each sub-query, in order to retrieve required results for the user. Thereafter, at step 908, the communication device may analyze if the retrieved results for any sub-query are less than two in count or not. In case, if the count of number of results retrieved for each sub-query comes out to be one or none, then the method may jump to step 914. Otherwise, if the count of any one of the sub-query (derived out of the multiple contact search query) come out to be two or greater than two in count then the method may proceed to the step 910.

The step 908 is crucial to determine as it is required to know if any of the sub-query has resulted in more than one contact. If any of the sub-query retrieved more than one contact, then it will be obvious that the results requires further filtering, as every sub-query is meant to retrieve a single result only. In such cases, it is required to output the more than one results to the user of the communication device in order to allow the user to select required result(s) and reject the rest of the results. Therefore, in case if none of the sub-query resulted in more than one result then there will be no need to consult the user to select required results. However, if even any one of the sub-query resulted in more than one result then consultation of the user will be required. This may also require a special output arrangement that outputs the multiple options to be chosen by the user, in user friendly fashion. Therefore, output arrangements for both of the aforementioned cases may be different, and in order to determine which output arrangement to choose for displaying results to the user, execution of the step 908 is mandatory.

At step 910, the communication device may arrange all the retrieved results in such a manner that all results are grouped by their related search queries (sub-queries). This may allow the communication device to output all the retrieved results for each sub-query separately to the user, so that the user may know by analyzing the results, which result is retrieved for which query. In an embodiment, the communication device may separate the results from different sub-queries by dividing them all with separate columns, such that, every column may have results retrieved for a particular sub-query. Such arrangement is illustrated in FIG. 6 of the invention.

In another embodiment, the communication device may only display those columns to the user those having more than one result in them. This may prevent display of un-necessary columns to the user, as the user may not have any choice to select desired results (as the column has one or none result). In another embodiment, the communication device may display the results in a list. The list may have row divisions. Each row may display results for a particular sub-query only. Such arrangement may be useful in the communication devices those have smaller display screen size.

At step 912, the communication device may display the retrieved results separately for each sub-query, in a user friendly fashion. Further, the communication device may provide a means to the user to select one or more results for each sub-query. In an embodiment, the user may select none of the displayed results. In another embodiment, the user may select all of the displayed results. Further, in an exemplary embodiment of the invention, the communication device may provide a checkbox along with the every displayed result. This may enable the user to check all the desired results and let the undesired results unchecked. Based on the selection made by the user, the communication device may retain the results selected by the user for further proceedings, and may discard the rest of the results. Thereafter, the method may jump to step 916, where the communication device may display the final set of the results to the user for the further proceedings.

Further, at step 914, the results retrieved for the multiple contact search query (from step 906) are displayed to the user in a user friendly manner. As it is determined at step 908, that all the results retrieved for the sub-queries of the multiple contact search query, retrieved only one or less than one result per sub-query. Therefore, the user may not have any option to choose desired results. However, the communication device may provide an option to the user to de-select any result that is un-wanted for the user.

Furthermore, at step 914, the communication device may either display the results column wise by grouping each result with its corresponding search sub-query, or may display the results row wise by grouping each result with its corresponding search sub-query. Also, the communication device may provide a checkbox or radio button along with the grouped result, which may enable the user to reject undesired results from the result set.

At step 916, the communication device may display the final set of results (selected by user) to the user. The communication device may display the final set of the results in a user friendly manner. In an embodiment, the communication device may display the results in a sequential manner. In another embodiment, the communication device may display the results grouped by its corresponding search queries. Further, based on the screen size and the screen resolution of the device, the communication device may either display the results column wise or row wise.

At step 918, the communication device determines the final action of the user of rejecting or accepting of the final set of results. In case, if the user rejected the final set of the results, then the method may start again from step 902, where the user may provide a corrected or new multiple contact search query to the communication device. Otherwise, if the user accepted the final set of the results, then at step 920, the communication device may perform the command, that was received from the user at step 902, on the final set of the results. After execution of the command on the final set of the results, the communication device may display the result of the execution to the user in a user friendly fashion.

Further, the method is not restricted to the above information as mentioned herein. The various embodiments, that are explained in FIGS. 1-7, may be utilized by each of the methods as explained here above. Further, the invention is not limited to the above-mentioned embodiments and examples and many other embodiments and examples may be implemented in light of the invention without departing from the scope of the invention.

Furthermore, it may be appreciated by a person skilled in the art that the device, system and method, corresponding to the present invention, provides means to enter a single query having multiple sub-queries merged therein, each sub-query being capable of searching and retrieving one or more intended results from a database. Also, the present invention provides a method to search multiple contacts via a single query, and thereafter allows the user to establish a communication channel between the selected contacts using a single command. These functionalities and features of the present invention are not restricted to the above mentioned description. Various embodiments (not restricted to the above description) may be implemented in light of the scope of the present invention.

Advantageously, the present invention provides a system, a method and a device to reduce manual effort of a user of a communication device to search separately all the contacts in order to connect them one at a time in a conference call. This reduces human intervention and efforts to increase efficiency of the system. Also, this prevents the conference attendants from remaining on hold, while the host connects with other attendants manually. Further, the present invention also enables the user to select multiple contacts with different names and number in a single screen, which gives enhanced user experience in the searching of contacts. Additionally, the present invention reduces manual effort of a user of a communication device to search separately all required contacts in order to send messages or emails or other contact related tasks.

Further, the present invention merges the use of the wildcards in the searching of the contacts, which ease the efforts of the user in search of contacts. Furthermore, the present invention provides a user friendly way of displaying searched results to the user of a communication device, which enhances the experience of a user of interaction with the communication device. Additionally, the present invention provides various types of result output representing strategies based on the display screen of the communication device.

It may be appreciated by a person skilled in the art that the invention is not limited to the advantages as mentioned here above. Further, many other advantages may be understood in light of the description given above without departing from the scope of the invention. Embodiments of the invention are described above with reference to block diagrams and schematic illustrations of methods and systems according to embodiments of the invention. It may be understood that each block of the diagrams and combinations of blocks in the diagrams can be implemented by computer program instructions. These computer program instructions may be loaded onto one or more general purpose computers, special purpose computers, or other programmable data processing translators to produce machines, such that the instructions that execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While embodiments of the invention has been described in connection with what are presently considered to be the most practical and various embodiments, it is to be understood that the invention is not to be limited to the disclosed embodiments, but on the contrary, is intended to cover various modifications and equivalent arrangements included within the spirit and scope of the appended claims. Embodiments of the invention have been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that embodiments of the invention may be practiced with other computer system configurations, including hand-held devices, multiprocessor systems, microprocessor-based or programmable consumer electronics, network PCs, minicomputers, mainframe computers, and the like. Further, embodiments of the invention may also be practiced in distributed computing worlds where tasks are performed by remote processing devices that are linked through a communications network. In a distributed computing world, program modules may be located in both local and remote memory storage devices.

This written description uses examples to disclose embodiments of the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for searching multiple contacts from a single query having multiple sub-queries, the system comprising:
    a delimiter module configured to divide the single query into multiple sub-queries based upon predefined rules;
    a parser module configured to search for multiple contacts corresponding to each of the multiple sub-queries;
    a display module configured to display the multiple contacts corresponding to the multiple sub-queries; and
    a processor configured to perform one of establishing a conference call and sending a message to at least one of the multiple contacts based on a user's preference.

2. The system of claim 1, wherein the delimiter module is configured to divide the single query into the multiple sub-queries based upon predefined special characters within the single query.

3. The system of claim 2, wherein the special characters comprises a wildcard.

4. The system of claim 1, wherein the system is a communication device.

5. The system of claim 1, wherein the display module is configured to analyze size of a display screen of the system to display the multiple contacts corresponding to the multiple sub-queries.

6. The system of claim 1, wherein the display module if configured to analyze resolution of a display screen of the system to display the multiple contacts corresponding to the multiple sub-queries.

7. The system of claim 1, wherein the display module is configured to display the multiple contacts according to a grouping based on the multiple sub-queries.

8. The system of claim 1, wherein the single query comprises the multiple sub-queries for adding multiple recipients into a conference call.

9. The system of claim 1, wherein the single query comprises distinctive multiple sub-queries in a plurality of formats.

10. A computer-implemented method of searching multiple contacts from a single query having multiple sub-queries, the method comprising:
    dividing the single query into multiple sub-queries based upon predefined rules;
    searching for multiple contacts corresponding to each of the multiple sub-queries;
    displaying the multiple contacts corresponding to the multiple sub-queries; and
    performing one of establishing a conference call and sending a message by the processor to at least one of the multiple contacts based on a user's preference.

11. The computer-implemented method of claim 10, wherein the dividing is based upon predefined special characters within the single query.

12. The computer-implemented method of claim 10, wherein the special characters comprising a wildcard.

13. The computer-implemented method of claim 10, wherein the displaying comprises analyzing size of a display screen the system to display the multiple contacts corresponding to the multiple sub-queries.

14. The computer-implemented method of claim 10, wherein the displaying comprises analyzing resolution of a display screen of the system to display the multiple contacts corresponding to the multiple sub-queries.

15. The computer-implemented method of claim 10, wherein the displaying comprises displaying the multiple contacts according to a grouping based on the multiple sub-queries.

16. A non transitory computer-readable medium having stored thereon instructions that, if executed by a processor, cause the processor to execute a method comprising:
    dividing a single query into multiple sub-queries based upon predefined rules;
    searching for multiple contacts corresponding to each of the multiple sub-queries;
    displaying the multiple contacts corresponding to the multiple sub-queries; and
    performing one of establishing a conference call and sending a message by the processor to at least one of the multiple contacts based on a user's preference.

17. The computer readable medium of claim 16, wherein the dividing is based upon predefined special characters within the single query.

18. The computer-readable medium of claim 16, wherein the special characters comprising a wildcard.

19. The computer readable medium of claim 16, wherein the displaying comprises display the multiple contacts according to a grouping based on the multiple sub-queries.

20. The computer readable medium of claim 16, wherein the displaying comprises analyzing size of a display screen the system to display the multiple contacts corresponding to the multiple sub-queries.

* * * * *